March 6, 1951 — S. WEISER — 2,544,371
MICROSCOPE WITH FRICTIONAL VERNIER DRIVE
Filed Dec. 12, 1947 — 2 Sheets-Sheet 1
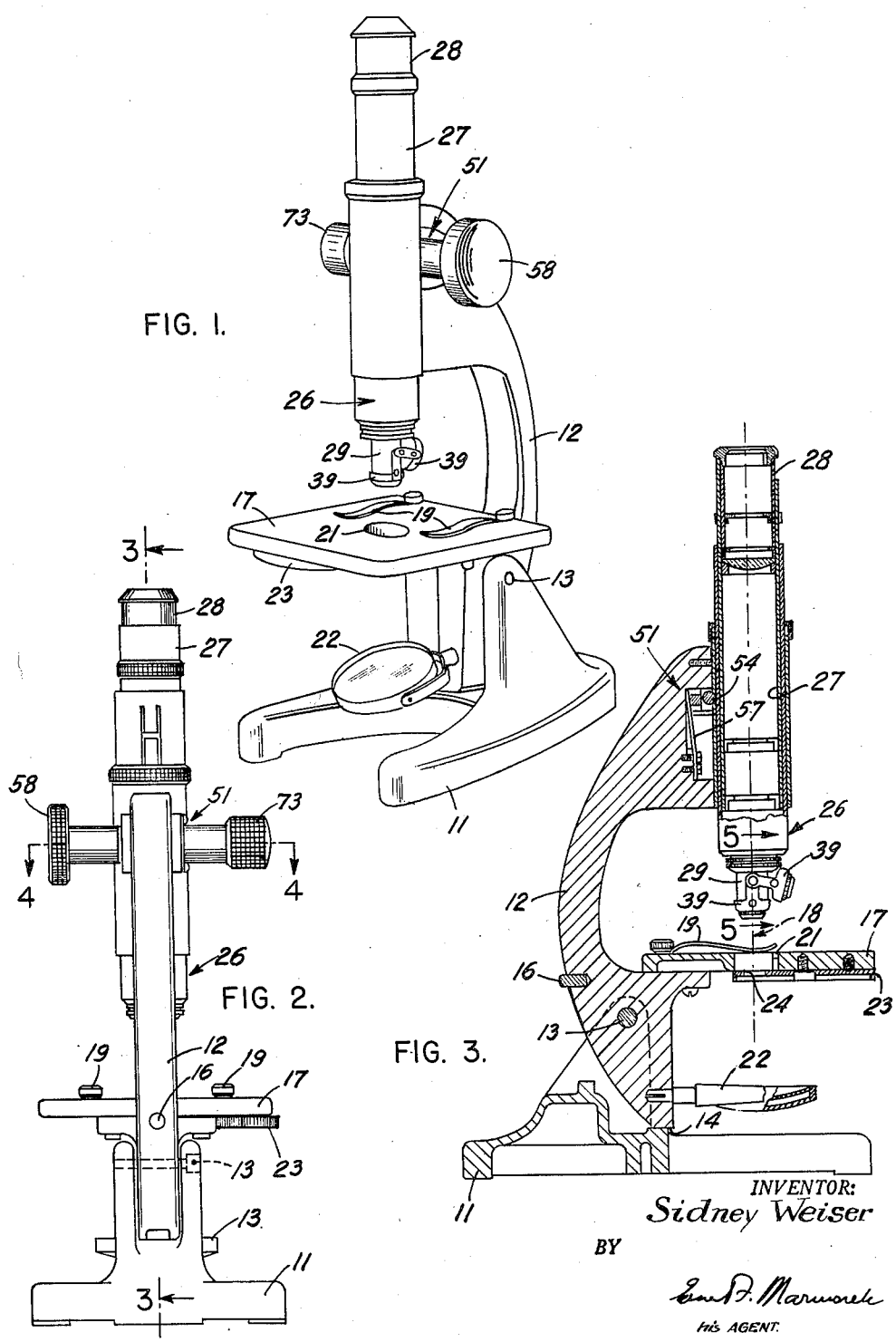
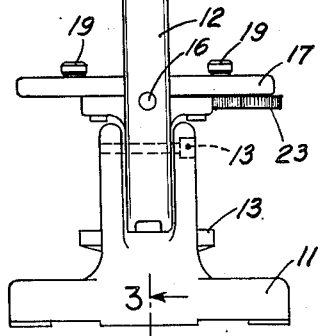
FIG. 1. FIG. 2. FIG. 3.
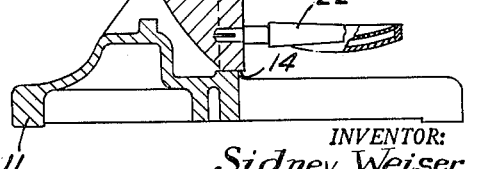
INVENTOR:
Sidney Weiser
BY
HIS AGENT.

March 6, 1951        S. WEISER        2,544,371
MICROSCOPE WITH FRICTIONAL VERNIER DRIVE
Filed Dec. 12, 1947        2 Sheets-Sheet 2
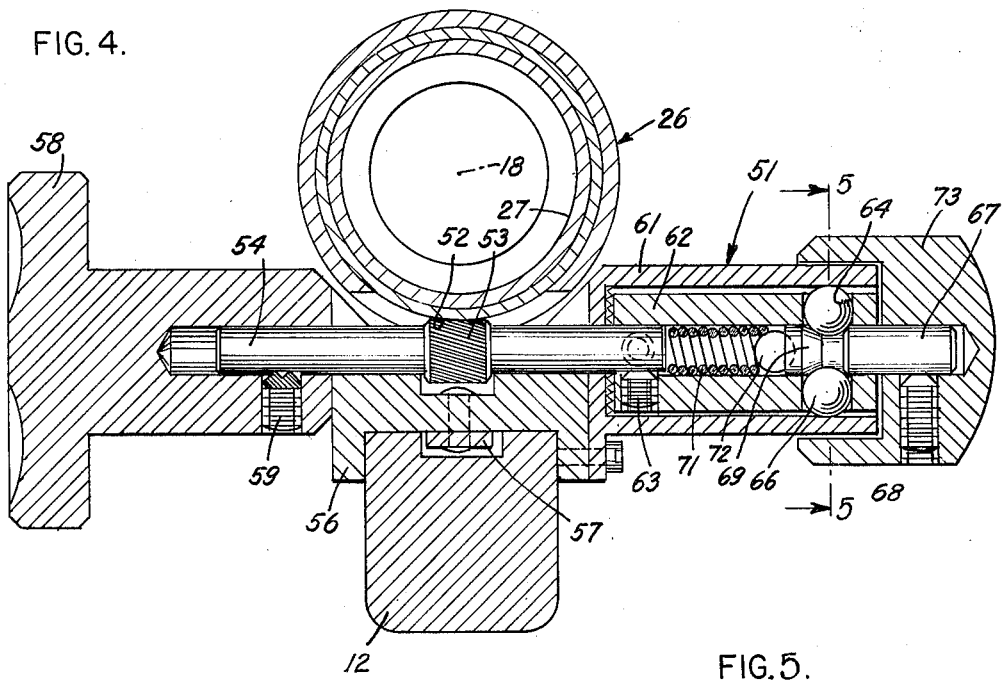
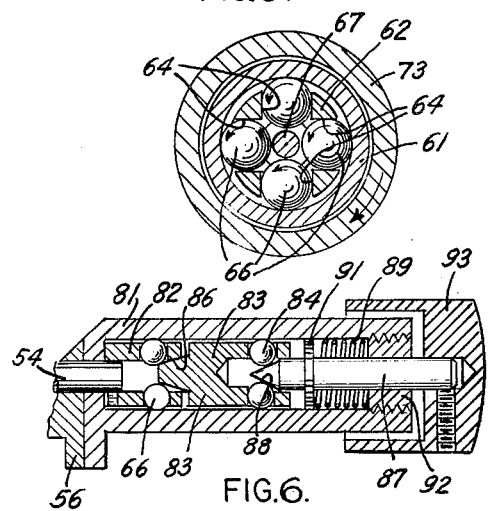
INVENTOR:
Sidney Weiser
BY
his AGENT.

Patented Mar. 6, 1951

2,544,371

UNITED STATES PATENT OFFICE 2,544,371

MICROSCOPE WITH FRICTIONAL VERNIER DRIVE

Sidney Weiser, New York, N. Y., assignor to Federal Manufacturing & Engineering Corp., a corporation of New York Application December 12, 1947, Serial No. 791,194

5 Claims. (Cl. 88—39)

The invention relates to microscopes and relates more particularly to microscopes with a vernier drive.

Microscopes are conventionally provided with an adjustment mechanism for raising and lowering the lens system, thereby focusing the instrument, and usually include a coarse adjustment for rapid movement of the optical system and a fine adjustment, for sensitive control of the movement of the optical system to bring the image into sharp focus. The subject to be examined under a microscope is usually supported on a thin glass plate, known as a slide. In focusing, it may often happen, particularly to an inexperienced user of the microscope, that the barrel carrying the objective lens system makes contact with the slide that is held on the microscope stage. At this point it is desirable that the movement of the objective carrier is stopped, to prevent injury to the lens, as a further movement would cause the glass slide to break and possibly to scratch the surface of, or even to break, the lens.

Most microscopes that are now in use, particularly of the inexpensive type, are not provided with an automatic stop upon contact of the lens barrel or the lens itself with the slide or the thin-cover-glass atop the slide.

It is consequently one of the primary aims of the invention to improve upon the devices of the prior art and to eliminate the deficiencies thereof.

One of the principal objects of the invention is the provision of a microscope with means for protecting the objective from injury or damage.

Another object of the invention is to provide a microscope with a focusing mechanism having different speeds.

A further object of the invention is to provide such a focusing mechanism that will idle when the objective makes contact with an immovable object.

A still further object is to provide a frictional vernier drive for fine focusing adjustment.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel construction, arrangement and combination of various devices, elements and parts, as set forth in the claims hereof, certain embodiments of the same being illustrated in the accompanying drawings and described in the specification.

For a fuller understanding of the nature and objects of the invention reference should be had to the following detailed description, taken in connection with the accompanying drawings, in which:

Fig. 1 is a perspective view of a compound microscope, in accordance with the invention;

Fig. 2 is a rear elevational view of the same;

Fig. 3 is a sectional view, partly in elevation, taken along line 3—3 of Fig. 2;

Fig. 4 is a sectional view taken along line 4—4 of Fig. 2;

Fig. 5 is a sectional view taken along line 5—5 of Fig. 4; and

Fig. 6 is a fragmentary sectional view, similar to Fig. 4, but at a smaller scale and embodying a modification.

In carrying the invention into effect in the embodiments which have been selected for illustration in the accompanying drawings and for description in this specification, and referring now particularly to Figs. 1-3, a base 11 is provided, and a frame 12 is secured thereto by means of an inclination pivot 13 which allows the frame to be tilted back at any convenient angle up to 90 degrees from the vertical. Stops 14 and 16 are provided against which the instrument may be brought to rest in either the vertical or the horizontal positions. A flat platform 17, the so-called stage, is secured to the frame 12 and tiltable together therewith and has an upper surface that is perpendicular to the optical axis 18 of the optical system. Slides holding the subject to be examined (not shown in the drawings) under the microscope may be placed on the upper surface of the stage 17 and be held there by slide-clips 19 which are adapted to exert gentle pressure sufficient to hold the slide in place without, however, interfering with manual movement of the slide on the stage surface.

The stage 17 has a circular opening 21 in the center through which light is admitted. A mirror 22 is tiltably mounted to the frame 12 below the stage opening 21 and can be turned in any direction to collect light rays and focus the same in a beam toward the slide through the opening 21. A diaphragm 23 is pivoted to the underside of the stage 17 and consists of a manually rotatable disc having a plurality of circular apertures 24 of different diameter that may be latched, selectively, in register with the optical axis 18 and below the opening 21 to control the light reaching the subject to be examined.

A lens carrier, for instance, an objective tube, generally indicated at 26, is movably mounted in the upper portion of the frame 12 and contains the lenses which, together, constitute the optical system of the microscope.

A draw tube 27 is slidably mounted on the interior of the objective tube 26 and supports near its upper end, in slidable relation, the ocular lens system or eye-piece 28.

A lower lens system or objective 29 is mounted at the lower end of the objective tube 26 and cooperates with the eye-piece to form a magnified image of the subject under observation.

The objective 29 is of the so-called convertible type and can be changed from one magnifying power to another by altering the lens system by adding to the normal lens another carried in one of the pivoted lens carriers 39.

A transmission or adjustment mechanism, generally indicated at 51, is provided to move the objective tube 26 along the optical axis 18 in a move relative to the frame 12, for focusing the lens system. The objective tube 26 is provided with a toothed rack 52 on its exterior, and a gear 53 is in mesh with said rack. Said gear 53 is mounted on a rotatable shaft 54 that is journalled in a resiliently held bearing 56. The bearing 56 is supported by a blade 57 that, in turn, is rigidly secured to the frame 12. The blade 57 is biased and resiliently presses the bearing 56 and therewith the entire adjustment mechanism towards the objective tube 26 and thus maintains the gear 53 in mesh with the rack 52. Although the adjustment mechanism 51 is thus resiliently movable to and from the surface of the objective tube 26, it is nevertheless stationary and fixed relative to the axial movement of the objective tube 26, and therefore the parts rigidly connected to the bearing 56 are hereinafter termed "fixed" or "stationary."

A knob 58 is directly connected, for instance by means of a set screw 59, to one end of the shaft 54, to provide for coarse adjustment. The fine adjustment, that provides a more sensitive control of the movement of the objective tube and thus of the entire optical system and which is used to bring the image into sharp focus after it has been rapidly adjusted in a preliminary movement by turning the knob 58, is of the vernier type and is constructed as follows.

A hollow enclosure structure, for instance a hollow cylinder 61, is rigidly connected to the bearing 56 and is thus "stationary" and surrounds in spaced relation the other end of the shaft 54 and projects beyond the same. A hollow cylinder 62 is mounted to said other end of the shaft 54 and secured thereto, for instance by means of a set screw 63 and is rotatable with the shaft 54. The movable cylinder 62 projects beyond that end of the shaft and is disposed within the interior of the stationary cylinder 61. This movable cylinder 62 is provided with four openings 64 that are arranged in the wall of the cylinder 62, along a circle, and spaced from each other, as best shown in Fig. 6. A rotatable element, for instance a sphere 66, is disposed in each opening 64 and is arranged to revolve therein. Instead of spheres other rotatable elements, such as rollers or the like may be used, as will be readily understood by those skilled in this and related arts. Each sphere 66 when rotated performs a planetary movement relative to the rotation of the shaft 54. The wall of the cylinder 62 is sufficiently narrow so that each sphere 66 projects beyond the outer as well as the inner surface of the cylinder, and each sphere is surrounded by, and in contact with, the inner surface of the stationary cylinder 61.

An auxiliary shaft 67 is provided that has a reduced portion 68 which is disposed on the interior of the movable cylinder 62 and is surrounded there by the spheres 66. A beveled surface 69 forms part of the auxiliary shaft 67 and is connected to the reduced portion 68 and is in contact with each sphere 66. The auxiliary shaft 67 is in alignment with the rotatable shaft 54 and is spaced from the end thereof.

A pressure spring 71 is disposed on the interior of said movable cylinder 62, in a chamber formed by said cylinder and the ends of said shafts 54 and 67, and bears on one side against the end of the shaft 54 and on the other side against a spherical member 72 that is in abutment with a concave end-surface of said auxiliary shaft 67. The spring 71 tends to force the auxiliary shaft 67 away from the rotatable shaft 54 but due to its bearing against the anti-friction spherical element 72, the spring exerts pressure without transmitting rotational movement intermediate said shafts. The pressure of the spring 71 is transmitted from the auxiliary shaft 67 to the beveled surface 69 thereof and thereby the spheres 66 are frictionally engaged by the beveled surface and are also forced outwardly into frictional engagement with the inner surface of the stationary cylinder 61.

The spring 71 is comparably strong (exerting for instance a pressure of 25 lbs.) and insures frictional engagement between the smooth surfaces of the spheres 66, the smooth bevelled surface 69 and the smooth inner surface of the stationary cylinder 61. Under normal circumstances, the transmission of rotation is without slipping; however, when the objective barrel 31 makes contact with an immovable object, the resultant pressure transmitted to the objective tube is sufficient to cause slipping of the spheres 66 with the contact surfaces, resulting in idling of the adjustment device 51.

A knob 73 is secured to the auxiliary shaft 67 and has a smaller diameter than the knob 58 to differentiate visually the fine from the coarse adjustment device.

As best shown in Fig. 5, when the knob 73 is turned clockwise, the auxiliary shaft 67 turns clockwise at the same angular speed. The spheres 66 are turned counter-clockwise since they roll off along the inner surface of the stationary cylinder 61; and they transport the movable cylinder 62 due to their dual or planetary movement, so that the movable cylinder 62 will be turned in a clockwise direction, but at reduced angular speed compared to that of the knob 73. In the exemplification illustrated in Figs. 4 and 5, the ratio of speed reduction due to the diameters involved is about four to one.

By combining two vernier devices a double vernier may be created resulting in an increased speed ratio and consequently in a more sensitive adjustment control. Such a double vernier device is shown in Fig. 6. A stationary cylinder 81 is rigidly secured to the bearing 56 and surrounds the end of the shaft 54 and projects beyond the same. A movable cylinder 82 is secured to the shaft 54 and rotatable therewith and carries a plurality of rotatable elements, such as spheres 66, for planetary movement. A second movable cylinder 83 is provided adjacent the movable cylinder 82 and also carries a plurality of rotatable elements such as spheres 84, for planetary movement, and is provided with a bevelled surface 86 that is in contact with said spheres 66. Both movable cylinders 82 and 83 are surrounded by the stationary cylinder 81 that is, with its inner surface, in contact with the spheres 66 and 84.

An auxiliary shaft 87 is aligned with but spaced from said shaft 54 and has a bevelled surface 88 that is in contact with the spheres 84. A spring 89 is positioned between a shoulder 91 of the auxiliary shaft 87 and a plug 92 that closes the stationary cylinder 81. Thereby, similar to the foregoing embodiment, the entire vernier device is completely enclosed and sealed. A knob 93 is secured to the auxiliary shaft 87 for transmitting manual rotation thereto. Since the diameters have been assumed to be the same as in the foregoing embodiment (notwithstanding the different scale of illustration) the ratio of angular speed reduction of this modified adjustment device is about sixteen to one.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is accordingly desired that in construing the breadth of the appended claims they shall not be limited to the specific exemplifications of the invention described herein.

Having thus described the invention, what I claim as new and desire to be secured by Letters Patent, is as follows:

1. In a microscope, the combination with, a frame, a lens carrying tube reciprocably movable in said frame, a rack on the exterior of said tube, a bearing structure connected to said frame, a shaft journalled in said structure and being rotatable, and a pinion secured to said shaft and rotatable therewith and in mesh with said rack to move said tube, a driving mechanism for turning said shaft, comprising in combination, a hollow cylinder secured to said shaft and rotatable therewith, a plurality of rotatable elements connected to the wall of said hollow cylinder and adapted to revolve therein in a planetary movement relative to said shaft and projecting laterally beyond the interior and exterior cylindrical surfaces of said cylinder, a stationary hollow cylinder connected to said frame and in contact on its interior surface with said rotatable elements on the exterior of said first cylinder, a rotatable auxiliary shaft disposed in alignment with said first shaft and spaced therefrom and including a bevelled surface in contact with said rotatable elements on the interior of said first cylinder, means for manually applying rotational movement to said auxiliary shaft and a spring disposed intermediate said shafts bearing non-frictionally against the same to urge them apart to press said rotatable elements into frictional engagement with said bevelled surface of said auxiliary shaft and simultaneously with said interior surface of said stationary cylinder, whereby rotation of said auxiliary shaft is transmitted to said rotatable elements, thence to said first cylinder and finally to said shaft, said shaft being rotated at reduced speed compared to said auxiliary shaft.

2. In a microscope, the combination with, a frame, a lens carrying tube reciprocably movable in said frame, a rack on the exterior of said tube, a bearing structure connected to said frame, a shaft journalled in said structure and being rotatable, and a pinion secured to said shaft and rotatable therewith and in mesh with said rack to move said tube, manual grasping means secured to one end of said shaft for direct manual rotation of said shaft to provide for coarse adjustment for said tube, and a driving device connected to the other end of said shaft to provide for fine adjustment for the tube, including a hollow cylinder secured near said other end to said shaft and rotatable together therewith and projecting therefrom and having openings transversal to the cylindrical axis, said openings spaced from said shaft, a plurality of rotatable elements each disposed in an opening of said cylinder and extending laterally beyond the inner and outer surfaces thereof and being rotatable therein in planetary rotation relative to the rotation of said shaft and said cylinder, a stationary hollow cylinder secured to said bearing structure and having an interior surface surrounding said first cylinder and being in contact with said rotatable elements, an auxiliary shaft aligned with said first shaft and spaced therefrom and protruding to the interior of said first cylinder and including a bevelled surface in contact with said rotatable elements, manual grasping means connected to said auxiliary shaft for turning the same, and pressure spring means intermediate said shafts bearing non-frictionally against the same to urge them apart for resiliently forcing said bevelled surface towards frictional engagement with said rotatable elements, whereby said elements are pressed into frictional engagement with said interior surface of said stationary cylinder.

3. In a microscope, a frame, a lens carrying tube reciprocably movable in said frame, a rack on the exterior of said tube, and a driving mechanism for said tube comprising a bearing structure connected to said frame, a rotatable shaft journalled in said bearing, a pinion secured to said shaft and normally held in mesh with said rack, and a knob at one shaft end portion for direct manual rotation thereof, in combination with, an auxiliary rotatable shaft in alignment with, but spaced from, said first shaft and having an oblique surface, a second knob secured to said auxiliary shaft to turn the same, and means for transmitting rotation from said auxiliary shaft, at reduced angular speed to said first shaft, including a sleeve rigidly secured to said bearing structure and having an inner surface surrounding said oblique surface of said auxiliary shaft, a plurality of movable spherical elements in contact with said oblique surface and said inner sleeve surface, to be rotated in a planetary movement relative to the axis of said aligned shafts when said auxiliary shaft is turned, and a hollow endless carrier coaxial with said aligned shafts and rotatable about the axis thereof and including radial openings for supporting said spherical elements spaced from each other, said carrier adapted to be rotated by said spherical elements when the latter are moved by said auxiliary shaft and being in driving connection with said shaft to transmit said rotation to said shaft and surrounding with the opposite ends of said shafts a chamber, a coiled spring disposed in said chamber and bearing against said shaft ends to urge the same apart, whereby said oblique surface will press said spherical elements against said sleeve surface.

4. In a microscope, the combination with a frame, a lens carrying tube reciprocably movable in said frame, and a rack on the exterior of said tube, of a demountable driving unit including a bearing structure, a mounting spring, a rotatable shaft journalled in said structure and a pinion secured to said shaft, said driving unit being substantially completely sealed except for said pinion and a small portion of said shaft adjacent the pinion, said unit being detachably secured to said frame with said mounting spring so that said pinion will be in mesh with said rack and resiliently be so maintained, means at one end of said shaft and extending to the structure exterior for manually rotating said shaft directly, an auxiliary rotatable shaft in alignment with, but spaced from, said first shaft and having a tapered surface flaring outwardly of the axis of said auxiliary shaft, means secured to said auxiliary shaft to turn the same, and means for transmitting rotation from said auxiliary shaft, at reduced angular speed to said first shaft, said last mentioned means including a sleeve rigidly secured to said bearing structure and having an inner surface surrounding said tapered surface of said auxiliary shaft, a plurality of movable spherical elements in contact with said tapered surface and said inner sleeve surface, to be rotated in a planetary movement relative to the axis of said aligned shafts when said auxiliary shaft is turned, and a hollow endless carrier coaxial with said aligned shafts and rotatable about the axis thereof and including radial openings for supporting said spherical elements spaced from each other, said carrier adapted to be rotated by said spherical elements when the latter are moved by said auxiliary shaft and being in driving connection with said shaft to transmit said rotation to said shaft, and surrounding with the opposite ends of said shafts a chamber, a spring disposed in said chamber and being tensioned to press, non-frictionally, against said shaft ends for urging the same apart to bring said tapered surface, said spherical elements, and said sleeve surface into substantially slip-free frictional rolling contact.

5. In a microscope, a frame, a lens carrying tube reciprocably movable in said frame, a rack on the exterior of said tube, and a driving mechanism for said tube comprising a bearing structure connected to said frame, a rotatable shaft journalled in said bearing, a pinion secured to said shaft and adapted to be in mesh with said rack, and a knob at one shaft end portion for direct manual rotation thereof, in combination with, an auxiliary rotatable shaft in alignment with, but spaced from, said first shaft, a second knob secured to said auxiliary shaft to turn the same, and means for transmitting rotation from said auxiliary shaft, at reduced angular speed to said first shaft, including a sleeve rigidly secured to said bearing structure and having a cylindrical interior surface substantially smoothly finished and surrounding a portion of said auxiliary shaft, said auxiliary shaft portion including a bevelled surface and a cylindrical surface adjacent thereto, a plurality of movable spherical elements normally in contact with said cylindrical and said bevelled surfaces of said auxiliary shaft and the surface of said sleeve, to be rotated in planetary movement relative to the axis of said aligned shafts when said auxiliary shaft is turned, said auxiliary shaft being movable axially to bring said bevelled surface in closer contact with said elements for increasing the rolling friction thereof, a hollow endless carrier coaxial with said aligned shafts and rotatable about the axis thereof and including radial openings for supporting said spherical elements spaced from each other and adapted to be rotated by said spherical elements when the latter are moved by said auxiliary shaft and arranged to transmit said rotation to said shaft, and a spring disposed intermediate said shafts and operable to move said auxiliary shaft axially and away from said first shaft, thereby to increase the rolling contact friction of said elements with said surfaces.

SIDNEY WEISER.

REFERENCES CITED

The following references are of record in the file of this patent:

UNITED STATES PATENTS

| Number | Name | Date |
|---|---|---|
| 198,914 | Gundlach | Jan. 1, 1878 |
| 528,211 | Sedgwick | Oct. 30, 1894 |
| 1,023,390 | Ott et al. | Apr. 16, 1912 |
| 1,106,956 | Meyer | Aug. 11, 1914 |
| 1,889,794 | Sabel | Dec. 6, 1932 |
| 1,986,177 | Zastoupil | Jan. 1, 1935 |
| 1,991,845 | Cramer | Feb. 19, 1935 |
| 1,991,846 | Cramer | Feb. 19, 1935 |
| 2,000,737 | Bauersfeld | May 7, 1935 |
| 2,017,823 | Taylor | Oct. 15, 1935 |
| 2,026,724 | Wollensak | Jan. 7, 1936 |
| 2,101,594 | Pensbee | Dec. 7, 1937 |
| 2,101,928 | Bausch | Dec. 14, 1937 |

FOREIGN PATENTS

| Number | Country | Date |
|---|---|---|
| 89,378 | Austria | Sept. 11, 1922 |
| 409,245 | Great Britain | Apr. 26, 1934 |